(12) United States Patent
Morgenbesser et al.

(10) Patent No.: US 12,454,959 B2
(45) Date of Patent: Oct. 28, 2025

(54) ACTUATING DEVICE, HAVING TWO VALVES WHICH ARE CONNECTED IN PARALLEL, FOR THE SENSITIVE AND FULL RANGE REGULATION OF ANY VOLUMETRIC FLOW

(71) Applicants: Karl Morgenbesser, Friedrichshafen (DE); Thorsten Neukamm, Friedrichhafen (DE)

(72) Inventors: Karl Morgenbesser, Friedrichshafen (DE); Thorsten Neukamm, Friedrichhafen (DE)

(73) Assignees: Karl Morgenbesser, Friedrichshafen (DE); Thorsten Neukamm, Friedrichshafen (DE)

( * ) Notice: Subject to any disclaimer, the term of this patent is extended or adjusted under 35 U.S.C. 154(b) by 0 days.

(21) Appl. No.: 17/998,134

(22) PCT Filed: May 6, 2021

(86) PCT No.: PCT/EP2021/061983
§ 371 (c)(1),
(2) Date: Nov. 10, 2023

(87) PCT Pub. No.: WO2021/224385
PCT Pub. Date: Nov. 11, 2021

(65) Prior Publication Data
US 2024/0271631 A1     Aug. 15, 2024

(30) Foreign Application Priority Data

May 6, 2020   (DE) .............................. 202020102557

(51) Int. Cl.
*F04D 27/02*           (2006.01)

(52) U.S. Cl.
CPC ...... *F04D 27/0223* (2013.01); *F04D 27/0215* (2013.01); *F05D 2270/46* (2013.01)

(58) Field of Classification Search
CPC ............. F04D 27/0223; F04D 27/0215; F05D 2270/46
See application file for complete search history.

(56) References Cited

U.S. PATENT DOCUMENTS 4,702,070 A   10/1987   Cureton et al.
5,152,316 A   10/1992   Dorr
(Continued)

FOREIGN PATENT DOCUMENTS

CN    201102967 Y    8/2008
CN    204719557 U    10/2015
(Continued)

OTHER PUBLICATIONS

German Patent Application No. DE20 2020 102 557.0, Search Report, dated Mar. 4, 2021.
(Continued)

*Primary Examiner* — Jesse S Bogue
(74) *Attorney, Agent, or Firm* — MARSHALL, GERSTEIN & BORUN LLP (57) ABSTRACT

Actuating device for systems with flowing fluid, in particular for fluid conveying systems, comprising at least one control element being open-loop controlled adjustable between a plurality of operating positions, at least one regulation element being closed-loop controlled adjustable, wherein said control element and said regulation element are connected in parallel in order to influence the same process variable and wherein said controller is set up for adjusting said control element as a function of an operating position of said regulation element.

18 Claims, 7 Drawing Sheets

(56) References Cited

U.S. PATENT DOCUMENTS

| | | | | |
|---|---|---|---|---|
| 5,290,142 | A | * | 3/1994 | Ispas .................. F04D 29/5826 415/17 |
| 5,762,468 | A | * | 6/1998 | Blotenberg ........... F04D 27/023 415/26 |
| 6,332,336 | B1 | | 12/2001 | Mirsky et al. |
| 9,822,785 | B2 | * | 11/2017 | Fletcher .................. B60T 17/02 |
| 11,971,044 | B2 | * | 4/2024 | Gallinelli ............ F04D 27/0253 |
| 2010/0189618 | A1 | | 7/2010 | White et al. |
| 2010/0272588 | A1 | * | 10/2010 | Scotti Del Greco ... F02C 1/005 417/408 |
| 2011/0027066 | A1 | | 2/2011 | Ono et al. |
| 2015/0047605 | A1 | * | 2/2015 | Buckland .............. F02B 37/164 123/403 |
| 2016/0102671 | A1 | | 4/2016 | Winkes |
| 2020/0131927 | A1 | * | 4/2020 | Tolmatsky .......... F16K 37/0083 |

FOREIGN PATENT DOCUMENTS

| | | |
|---|---|---|
| DE | 1107887 B | 5/1961 |
| DE | 3605293 A1 | 9/1986 |
| DE | 3907289 A1 | 9/1990 |
| DE | 19541192 A1 | 5/1997 |
| DE | 60013933 T2 | 10/2005 |
| DE | 102014215685 A1 | 2/2015 |
| EP | 2042743 A1 | 4/2009 |
| EP | 2530329 A1 | 12/2012 |
| SU | 1643800 A1 | 4/1991 |
| WO | WO-2005/121559 A1 | 12/2005 |
| WO | WO-2010044493 A1 | 4/2010 |
| WO | WO-2010066662 A2 | 6/2010 |
| WO | WO-2014/191312 A1 | 12/2014 |
| WO | WO-2017005842 A1 | 1/2017 |
| WO | WO-2020207627 A1 | 10/2020 |

OTHER PUBLICATIONS

International Application No. PCT/EP2021/061983, International Search Report and Written Opinion, mailed Jul. 20, 2021.

* cited by examiner

ACTUATING DEVICE, HAVING TWO VALVES WHICH ARE CONNECTED IN PARALLEL, FOR THE SENSITIVE AND FULL RANGE REGULATION OF ANY VOLUMETRIC FLOW

The invention relates to an actuating device for systems with flowing fluid, in particular for fluid conveying systems. The invention also relates to a system with such an actuating device.

A classic application for actuating devices is found in fluid conveying systems. Centrifugal compressors, for example, are used to compress any gas, such as air. In practice, centrifugal compressors can be used in applications where large volume flows are to be compressed. These include blast furnace blowers, air separation plants, chemical and petrochemical plants, applications for pressure boosting in gas pipelines, vacuum blowers in the paper industry, vapor recompression in evaporation processes, and also air compressors.

Centrifugal compressors, especially those with electric drive, must be able to start up against minimum backpressure due to the reduced torque of the electric motor during ramp-up. Adequate anti-surge regulation is required for stable operation with reduced flow rate, with a small safety margin to the surge limit (stability limit of a centrifugal compressor). In the event of compressor or process malfunctions, it should be possible to relieve the pressurized compressor as quickly as possible. A centrifugal compressor should not surge even after a load shutdown during rundown. Rapid relief should also meet high safety requirements.

In order to meet the above requirements, regulation elements are required during operation. Due to the large number of functions to be performed, these are designed to be oversized. Thus, in view of the conflicting requirements—large flow rates on the one hand and precise closed-loop control on the other—such actuating elements are equipped with a wide range of special accessories. These include, for example, high-capacity positioners, volume boosters, drain amplifiers, solenoid valves, throttles, asymmetrical delay relays, and/or supply air stations. Although the specifications of compressor manufacturers and plant constructors can be largely met with regulation elements equipped in this way, however, this is at the expense of control performance.

Overall, a setup with such regulation elements leads to a high level of complexity and susceptibility to faults. Fault location or operational optimization with the instruments available at the operating sites is feasible only with difficulties, if at all.

Components of such special accessories are connected via lines, wherein each connection point creates a potential leakage point. For example, positioners are installed for pneumatic actuating drives that move the respective actuating element by switching small solenoid valves or piezo-driven valves. Leakage causes these actors to switch frequently, so that the maximum achievable number of switching operations is reached after only a few months or weeks. As a result, the valves no longer switch reliably. They are stuck either in the OPEN or in the CLOSED position. Both can have significant effects, up to total failure; this applies both to the compressor and to a downstream process.

Considering the above and such, the task of the present invention was to specify an actuating device which allows precise closed-loop control with at the same time large flow rates and, in addition, ensures improved operational safety.

Likewise, the task was to specify a system with such an actuating device.

With respect to the actuating device, the foregoing task has been solved by the subject matter of claimed actuating device. With regard to the system, this task has been solved by the subject matter of the claimed system. Advantageous embodiments are indicated in each case in the dependent claims and are explained below.

An actuating device according to the invention is designed for systems with flowing fluid, in particular for fluid conveying systems.

Such an actuating device has at least one control element, which can be adjusted in an open-loop controlled manner between a plurality of operating positions, and at least one regulation element, which can be adjusted in a closed-loop controlled manner. According to the invention, the control element and the regulation element are connected in parallel to influence the same process variable, and the control element is set up for adjustment as a function of an operating position of the regulation element.

By providing two control elements connected in parallel, they can each be designed and dimensioned with regard to different tasks. By dividing the desired functions between two separate actuating elements in this way, the degree of complexity of the individual components and thus the risk of operational malfunctions can be reduced.

While the control element can be used to realize relatively large flow rates if required, the regulation element enables sensitive closed-loop control. The division into separate actuating elements allows the regulation element to be designed primarily with a focus on control accuracy.

According to the invention, the realization of a high control performance with at the same time high flow rates by a single and thus complex control element can be avoided.

Due to the parallel connection of the control element and the regulation element, precise closed-loop control can be achieved for any flow rate. The adjustment of the control element as a function of an operating position of the regulation element ensures that a suitable regulation range of the regulation element is always maintained during operation. However, adjusting the control element as a function of the regulation element significantly extends the overall control range without increasing the complexity of the individual components or the entire arrangement.

Whenever the present invention refers to a control or a controlling, as a rule this refers to an open-loop control system or rather an open-loop control manner.

Whenever the present invention refers to regulation or a regulating, as a rule this is intended to mean closed-loop control system or rather a closed-loop control manner.

Preferably, the control element can be adjusted open-loop controlled between more than two operating positions, in particular between two end positions and any number of intermediate positions.

According to a preferred embodiment, the control element can be set up for adjustment as a function of an operating position assumed by the regulation element when a limit setting value is passed, in particular an operating position of the regulation element assumed when a low limit setting value is undershot and/or an operating position of the regulation element assumed when a high limit setting value is exceeded.

By adjusting the control element in such a open-loop controlled manner, the regulation element can be kept well within a desired control range.

When a limit actuating value is passed by the regulation element, the thereby initiated adjustment of the control element will cause the regulation element to move back in the opposite direction.

Preferably, the control element can be set up for a open-loop controlled adjustment that generates a closed-loop controlled adjustment of the regulation element back into a target operating range, in particular from a range below a low limit setting value and/or from a range above a high limit setting value into a target operating range. This ensures that a high control performance is maintained over the entire operating range.

According to a further preferred embodiment, a controller can be provided which is set up to adjust the control element as a function of an operating position of the regulation element. Furthermore, a regulation can also be provided which is set up to adjust the regulation element as a function of a process variable influenced by the control element and the regulation element. With such open-loop control, respectively, closed-loop control, the control element, respectively, the regulation element can be operated in a suitable manner and a sensitive regulation can be realized over the entire operating range.

In a further preferred way, an open-loop control of the control element can be set up to continue adjusting the control element until the regulation element has reached and/or passed a predefined operating position within the target operating range. Such predefined operating positions can be user-configurable (e.g. 50% or also 45% and 55%) or adjustable subsequently. In this way, stable operation of the regulation element and the control element can be ensured, in particular without the risk of undesired building-up.

According to a further preferred embodiment, for example, a low limit setting value can be set at an operating position of the regulation element that is open by 10% and/or a high limit setting value can be set at an operating position of the regulation element that is open by 90%. The respective limit actuating values can be user-configurable or subsequently adjustable depending on the application. Such limit values can be used to define an optimum operating range or target operating range of the regulation element in a suitable manner.

Preferably, a predefined target operating range of the regulation element can extend, for example, between a 10% and 90% open operating position of the regulation element. The respective target operating range can be user-configurable or subsequently adjustable depending on the application. A target operating range dimensioned in this way ensures optimum operation with a safe distance to the respective end positions of the regulation element.

Whenever in the sense of the present invention percentage indications are given with respect to positions of control elements, such indications as a rule refer to positions where 100% describes a fully open position and 0% describes a fully closed position. Figures between 100% and 0% describe correspondingly wide open and wide closed positions, respectively.

Preferably, the control element can be set up for fully automatic, partially automatic and/or merely manual adjustment as a function of an operating position of the regulation element.

A fully automatic adjustment can reduce the operating effort during operation to a minimum. Partially automatic adjustment can be achieved, for example, by generating a signal to an operator, in particular an optical or acoustic warning signal, when a limit actuating value is passed through the regulation element, whereupon a manually initiated adjustment of the control element can be initiated. The control element can also be adjusted manually, for example by an operator continuously monitoring the passage of a limit actuating value through the regulation element. If necessary, an adjustment of the control element can then be initiated manually.

In a further preferred manner, the regulation element has an electric actuating drive and/or is driven by an electric actuating drive. Electric actuating drives allow precise adjustment and thus also contribute to accurate closed-loop control of the position of the regulation element.

In a still further preferred embodiment, the control element may have an electric actuating drive and/or be driven by an electric actuating drive. Also with regard to the control element, an electric actuating drive permits precise adjustment and thus also enables precise open-loop control of the position of the control element.

In a particularly preferred manner, the control element can have a greater flow capacity than the regulation element. With the term flow capacity the possible flow rate per time interval is to be understood, which can be achieved by the respective actuating element. Such design allows a particularly advantageous closed-loop control over a relatively large operating range. A relatively small regulation element ensures sensitive regulation, and with a relatively large control element, an overall large operating range or an overall large flow capacity can be provided.

Further preferably, the control element can be designed as a open-loop controlled valve and/or the control element can be adjustable between a plurality of operating positions for throttling and/or shutting off a flowing fluid.

Preferably, the regulation element can be designed as a closed-loop controlled valve. The regulation element can also be adjustable to throttle and/or shut off a flowing fluid.

Such valves are suitable for a wide range of applications and can be suitably used and combined in fluid conveying systems.

Preferably, the control element can be set up for quick relief or quick shut-off, in particular for quick relief into a fail-safe position OPEN or for quick shut-off into a fail-safe position CLOSED.

The regulation element can also be set up for quick relief or quick shut-off, in particular for quick relief to a fail-safe position OPEN or for quick shut-off to a fail-safe position CLOSED. In this way, a hazard-relevant situation can be counteracted in only a short time. Critical system components can thus be protected against damage. In many applications, this can be particularly important for ensuring operational safety.

In a further preferred manner, the control element and the regulation element are designed for use with centrifugal compressors. Centrifugal compressors are used in a variety of applications for compressing gases. By designing the control element and the regulation element for use with centrifugal compressors, a high degree of operational reliability can be achieved in such applications with a simple and structurally robust design.

It can also be advantageous if the control element is designed and/or set up for start-up relief and/or for event-controlled rapid relief during operation of a centrifugal compressor. In many cases, it is the start-up relief that enables an electric motor-driven centrifugal compressor to be started up. Event-controlled rapid relief can be used in the event of malfunctions to prevent damage to the compressor or the downstream process.

Further preferred, a tight-closing regulation element can be designed and/or set up for anti-surge, in particular by an anti-surge regulation. With such a regulation element, stable operation along the surge line can be maintained for a centrifugal compressor.

In contrast, the control element can be designed and/or set up for surge protection, in particular by means of surge protection control. A centrifugal compressor surges if an anti-surge regulation does not intervene or intervenes too late. Continuous surging can very quickly lead to massive damage to the compressor and fatal effects on the downstream process. This can be prevented with a surge protection control that is only activated by a surge event and subsequently activates a rapid relief via the control element and/or the regulation element or a shutdown of the motor.

According to a further preferred embodiment, the regulation element may have a linear, equal percentage or individualized opening characteristic.

Any application-related optimization can be achieved by an individualized opening characteristic.

Preferably, the control element can have a non-linear characteristic, in particular a fast-opening characteristic, in which the change in flow rate per actuator unit increases disproportionately when the valve leaves the closed position.

In this way, a particularly fast pressure relief can be achieved by the control element.

In a further preferred manner, the control element and/or the regulation element can be set up to check the freedom of movement, in particular for test movements at predefined time intervals. Certain applications require the adjustment of actuating elements only at longer time intervals. If the control element is not actuated for a longer period of time, it may jam. Test travel motions at predefined time intervals can prevent such jamming or at least detect it at an early stage so that suitable measures can be taken.

Preferably, the control element and the regulation element can form a structural unit and/or be designed as a dual actuating element. Such a design allows particularly simple installation in a fluid conveying system. At the same time, the individual control elements can be preset in an advantageous manner when designed as a dual actuating element.

It can be as well of advantage if the control element has a housing with connections for the installation of the regulation element. This compact unit is particularly suitable for replacing an already installed control element without additional welding work on the pipeline.

According to a further preferred embodiment, in order to reduce dead times from the CLOSED position, the regulation element can be set up with a positioner and/or its control by the regulator to act with full actuating capacity in the event of a corresponding regulation deviation of the closed-loop control until the valve effectively starts to open. The regulation element can also be set up, with the start of opening, to switch from said open-loop controlled adjustment with full capacity to a closed-loop adjustment with standard capacity. In this way, the achievement of an effective start of opening can be accelerated.

Furthermore, the regulation element can have a pneumatic actuating drive and the actuating drive can be operated for opening at full actuating capacity with suspension of control parameters and/or with suspension of pulsed control and/or with permanent control until an effectively opened operating position is reached. In this way, dead times of the regulation element can be avoided or reduced to a minimum.

Further preferred, the regulation element can have an electric or hydraulic actuating drive and the actuating drive can be operated at maximum actuating speed for opening at full actuating capacity, in particular from an overlapping tight valve position, until an effectively opened operating position is reached. In this way, dead times of the regulation element can be avoided or reduced to a minimum.

Preferably, the control element can be designed as a butterfly valve actuating element that has a limit range adjacent to a CLOSED position. It is possible that such limit range according to the manufacturer and/or due to constructional issues is not designed for continuous operation. In particular, the flow velocity in such a critical range can be high, e.g. at the speed of sound, which causes dynamic forces on the butterfly valve plate in alternating directions. This results in increased sound generation combined with increased wear and poor control performance. Wear on the butterfly valve plate leads to leakage and thus to permanently inefficient operation.

Therefore, continuous operation in such a limit range can be prevented by control parameters. As an example, the control parameters can be selected or set in such a way that such a limit range is only traversed during operation and continuous operation in the limit range is thus avoided.

When using such an open-loop controlled butterfly valve actuating element, the regulation range of the regulation actuating element designed as a regulation valve or regulation butterfly valve can advantageously be dimensioned at least as large as the limit range of the butterfly valve actuating element. In particular, when a butterfly valve actuating element is used as a control element, the regulation range of a regulation element can be advantageously designed so that at least a limit range of the butterfly valve actuating element specified by the manufacturer is covered. Individual process requirements may demand a larger regulation range.

Preferably, the control element and/or the regulation element can be set up to use the pressure of the fluid as the exclusive, main or supporting actuating force to move to a fail-safe position for quick relief and/or quick shut-off. By using a pressure that is already present for quick relief or quick shutoff, the relief or shut-off process can be accelerated in a particularly advantageous manner. At the same time, rapid relief or rapid shut-off can be achieved with a high degree of certainty due to the energy from the pressure of the fluid that is available anyway in critical operating situations. Since little or no adjustment energy needs to be stored in such an embodiment, a surprising and significant simplification of the fail-safe functionality can be realized.

Preferably, the control element and/or the regulation element can be set up as a fail-safe device to use the pressure of the fluid as the exclusive, main or supporting actuating force for moving to a fail-safe position in the event of a failure of a supply of drive energy, in particular in the event of a failure of an electrical energy supply to the control element and/or the regulation element. Separate safety elements, such as positioning springs, can be completely omitted in this way or at least be dimensioned smaller, thus reducing manufacturing costs.

Accordingly, the control element and/or the regulation element can be set up as a fail-safe device to use a spring force as the exclusive, main or supporting actuating force for moving to a fail-safe position in the event of failure of a pneumatic or hydraulic power supply to the control element and/or the regulation element by an actuating medium independent of the fluid, in particular in the event of failure of an instrument air or failure of control oil.

In a further preferred manner, the control element and/or the regulation element can be set up to move to a fail-safe position for rapid relief with reduced or minimized electrical energy or without electrical energy. This can further improve operational safety. In such an embodiment, no electrical energy or only a reduced electrical energy is required to reach a fail-safe position. A fail-safe position can be reached even in the event of malfunctions in the electrical power supply.

Preferably, an actuating drive of the control element and/or of the regulation element can be uncoupled for moving to a fail-safe position, in particular by means of a switchable coupling with fail-safe function. Such decoupling can simplify or accelerate the approach to the fail-safe position, since any counteracting forces of the actuating drive are avoided.

Even more preferably, the switchable coupling with fail-safe function can be closed under electrical power and open in the event of a power failure and uncouple by opening. In the event of a fault in the electrical power supply, uncoupling and thus also approaching a fail-safe position can take place with a high degree of reliability.

Preferably, an actuating drive of the control element and/or the regulation element can be operated at a higher speed for approaching a fail-safe position, in particular by switching to a different gear ratio or by increasing the drive speed in the case of a variable-speed design. In this way, the approach to a fail-safe position can be accelerated with very simple means.

According to a further preferred embodiment, the control element and/or the regulation element can be set up to move to a safety position driven by an opening piston for rapid relief. Such a design is robust in construction and can ensure the approach to a safety position even in the event of a failure of the drive energy.

Furthermore, it is possible for the opening piston to be controlled by a solenoid valve which opens in the de-energized state, whereby in the open state of the solenoid valve the opening piston is acted upon by a pressurized fluid. In this way, the pressurized fluid can be reliably used to approach a fail-safe position.

Preferably, the control element and/or the regulation element can be set up to move to a fail-safe position directly driven by a pressurized fluid for rapid relief. This can be achieved with a relatively small number of components, which ensures a design that is not susceptible to faults. In particular, such a setup can be realized without separate components for approaching a safety position.

At least one of the actuating elements, in particular the control element and/or the regulation element, can be designed as a pressure-balanced actuating element. Since no gas forces have to be overcome in a pressure-balanced actuating element, the actuating forces required during operation are low.

It is also possible that at least one of the actuating elements, in particular the control element and/or the regulation element, is designed as a non-pressure-balanced actuating element. A non-pressure-balanced actuating element can advantageously be moved into a fail-safe position directly driven by a pressurized fluid, in particular without separate drive components.

In the case of pneumatic and hydraulic actuating drives, the pressure of the fluid in normal operation can also be used to adjust the respective actuating element. In this case, any pneumatic and/or hydraulic actuator can be dimensioned smaller.

Another aspect of the present invention relates to a system having a conveying device for a flowing fluid, in particular a centrifugal compressor, and having an actuating device described above. The arrangement according to the invention in such a system is simple and robust in design, and at the same time ensures sensitive closed-loop control over an arbitrarily large capacity range by means of the actuating device.

The control element and the regulation element are preferably installed in parallel lines. This allows the control element and the regulation element to influence the same process variable in an advantageous manner.

It can be further advantageous if the control element is installed in a pipe in which connections for the installation of the regulation element are integrated immediately upstream and downstream of the control element. The installation of the regulation element can be simplified in this way, as no welding work is required for piping.

Preferably, a fitting piece for the connection of the control element and/or the regulation element can be provided in at least one line. The connection for a control element and/or regulation element can be realized via such a fitting piece. This solution is predestined for subsequent expansion with actuating elements, since no welding is required on the existing line system and an existing control element can be retained.

Even more preferably, the regulation element can be integrated in a fitting piece that has connections for the installation of an external control element. Optimization of the system by adding a further actuating element can thus be simplified.

It can also be advantageous if the controller of the conveying equipment, in particular the centrifugal compressor, is designed and/or set up for an open-loop shutdown. This device causes the fast opening of the actuating elements involved to be activated immediately upon failure of the drive. Without activation, damage can occur, in particular in the intake area of a centrifugal compressor. Within a predefined time after activation of the fast opening, reaching the fail-safe position can be detected, otherwise the compressor is switched off.

According to a further preferred embodiment, the conveying device, in particular the centrifugal compressor, can be designed and/or set up to detect a malfunction of the rapid relief of the control element and/or of the regulation element by the absence of a feedback signal (OPEN or CLOSED, respectively) within a predefined and/or parameterizable time interval after activation of the control element and/or of the regulation element and to activate a fault shutdown depending on a malfunction of the rapid relief of the control element and/or of the regulation element. With such monitoring, a fault shutdown can be initiated and fatal damage can be avoided.

A further aspect of the present invention relates to a method for open-loop control and/or closed-loop control of a system with flowing fluid, in particular for a fluid conveying system, in which at least one control element is adjusted in an open-loop controlled manner between a plurality of operating positions and in which at least one regulation element is adjusted in a closed-loop controlled manner, the control element and the regulation element being connected in parallel in order to influence the same process variable, and the control element being adjusted as a function of an operating position of the regulation element.

The details and advantages described above with respect to the actuating device according to the invention also apply in the same way to the system and method according to the invention.

The invention is described as follows by way of example with reference to the accompanying figures.

It is shown, each schematically.

Figure 1:
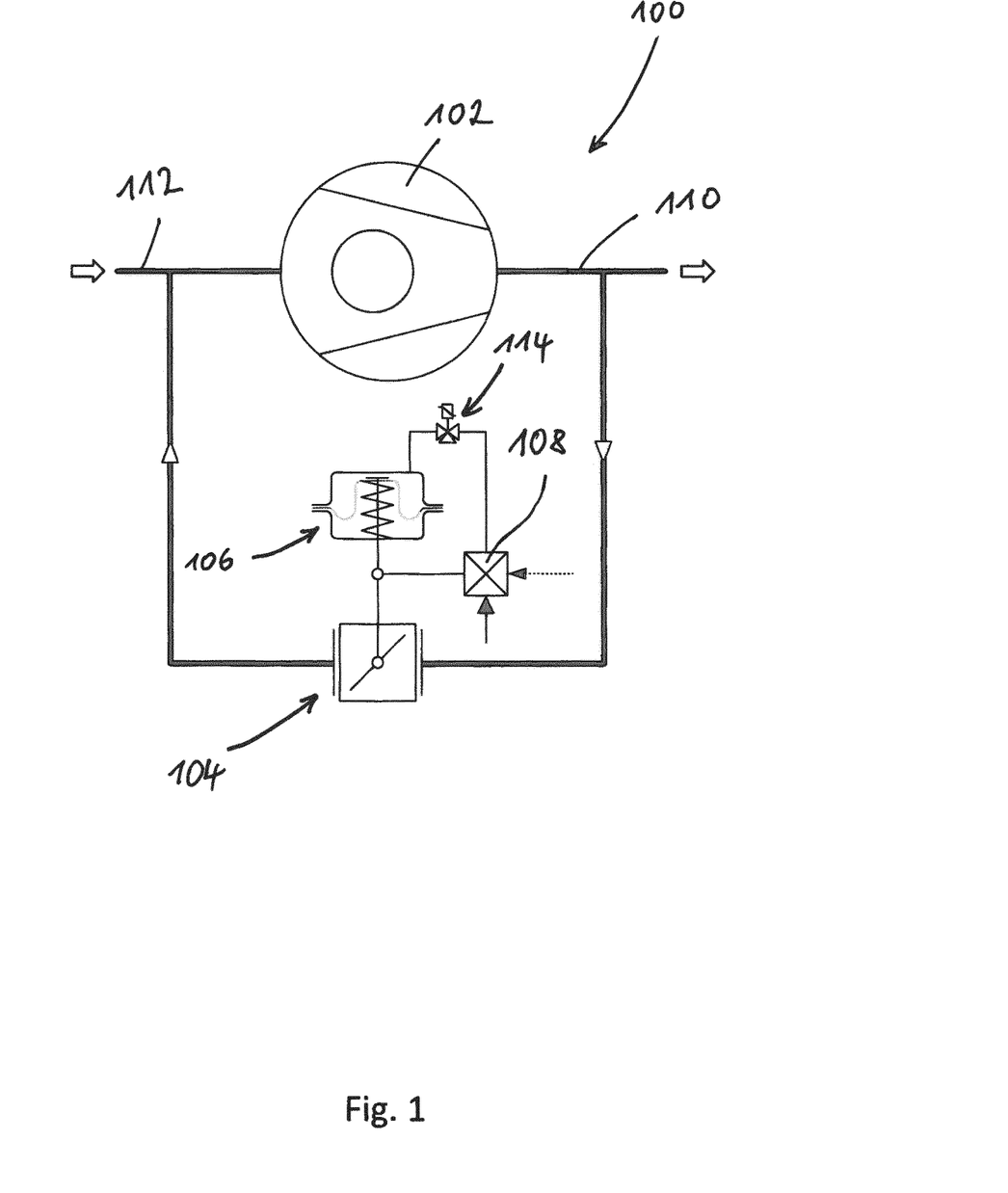
FIG. 1 a fluid conveying system with a centrifugal compressor and an actuating device according to the state of the art, FIG. 2 A fluid conveying system comprising a centrifugal compressor and an actuating device according to one embodiment of the present invention, FIG. 3 a fluid conveying system comprising a centrifugal compressor and an actuating device according to a further embodiment of the present invention, FIG. 4 a fluid conveying system comprising a centrifugal compressor and an actuating device according to a still further embodiment of the present invention, FIG. 5 a fluid conveying system comprising a centrifugal compressor and an actuating device according to a still further embodiment of the present invention, FIG. 6 a fluid conveying system comprising a centrifugal compressor and an actuating device according to a still further embodiment of the present invention, FIG. 7 a logic for controlling a control element as a function of the position of a regulation element according to an embodiment of the present invention.

FIG. 1 schematically shows a fluid conveying system 100 with a centrifugal compressor 102 and an actuating device 104 according to the prior art. In such an embodiment, the actuating device 104 conventionally comprises a single regulating butterfly valve moved by a pneumatic diaphragm regulating actuator 106 with associated positioner 108.

The actuating device 104, which is in the form of a regulating butterfly-valve, can be a so-called bypass valve, for example, which directs gas from the discharge line 110 back into the suction line 112. A ⅔-way solenoid valve 114 may be provided for both quick opening and also provide fail-safe functionality.

In an embodiment according to FIG. 1, the actuating device 104 in the form of a regulating butterfly-valve must meet several requirements at once. Both a sensitive closed-loop control and a relatively large flow rate must be realized. For this reason, the actuating device is large in size and at the same time equipped with many accessories. This leads to high susceptibility to faults and high acquisition costs.

Figure 2:
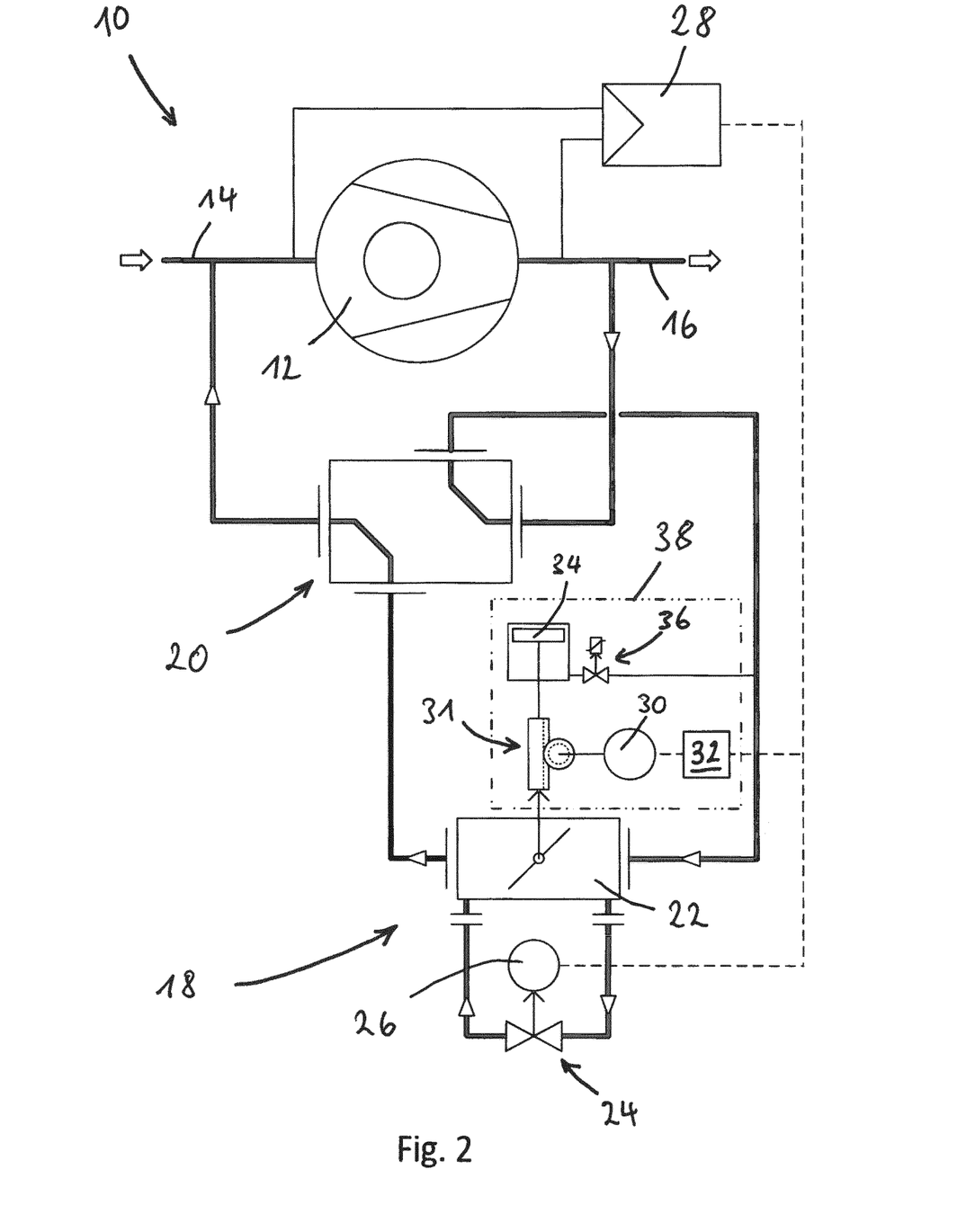

FIG. 2 shows a fluid conveying system 10 according to one embodiment of the present invention. The fluid conveying system 10 has a centrifugal compressor 12, a suction line 14 upstream of the centrifugal compressor 12, and a discharge line 16 downstream of the centrifugal compressor 12.

The fluid conveying system 10 in FIG. 2 differs from the fluid conveying system 100 in FIG. 1 by the arrangement of the actuating device 18 instead of the actuating device 104 in the form of a large regulating butterfly-valve. The system 100 in FIG. 1 can be converted to a system 10 according to the invention in FIG. 2. For this purpose, the regulating butterfly-valve 104 can be removed and a fitting piece 20 with internal line routing and with connections for an actuating device 18 according to the invention can be provided in its place, as can be seen in FIG. 2. With such a fitting piece 20, it is possible to integrate an actuating device 18 according to the invention into an existing line system without welding work.

The actuating device 18 according to the invention has at least one control element 22, which can be adjusted in an open-loop controlled manner between a plurality of operating positions, and at least one regulation element 24, which can be adjusted in a closed-loop controlled manner between a plurality of operating positions. The control element 22 and the regulation element 24 are connected in parallel to influence the same process variable and/or the same process variables. The process variables are in particular the pressure in the suction line 14 and the pressure in the discharge line 16.

According to the invention, the control element 22 is set up for adjustment as a function of an operating position of the regulation element 24. The control element 22 can be designed as a large and pressure-compensated actuating element and/or as a butterfly valve actuating element and can move to a fail-safe position OPEN.

Integrated in the housing of the control element 22 are two connections for the lines to and from the regulation element 24. A relatively small actuating element is shown as regulation element 24, which is moved by an actuating drive 26. The regulation element 24 can move to a fail-safe position OPEN.

The actuating drive 26 can be controlled by an anti-surge regulator 28. In doing so, the anti-surge regulator 28 can control the actuating drive 26 as a function of the surge-relevant variables measured in the suction line 14 and/or in the discharge line 16 (for example, flow and pressure).

The control element 22 can be moved by a variable-speed actuating drive 30 via an adjustment logic 32. A gear 31 can also be provided between the actuating drive 30 and the control element 22. The adjustment logic 32 may receive signals from the actuating drive 30, from the anti-surge regulator 28, and/or from the regulation element 24 or the actuating drive 26 for the regulation element 24, respectively, to adjust the control element 22.

The control element 22 is further adapted to approach a safety position driven by an opening piston 34 for quick relief, in particular to an OPEN position. The opening piston 34 can advantageously be actuated by the process medium from the discharge line 16. To ensure a fail-safe functionality for the opening piston 34, a solenoid valve 36 is provided which is open in the de-energized state. In the event of a power failure, pressure from discharge line 16 can thus actuate opening piston 34, which moves the control element in the OPEN direction.

In the embodiment according to FIG. 2, the opening piston 34, the solenoid valve 36, the actuating drive 30 with gear 31 thus form a device 38 for rapid movement of the control element 22 into a fail-safe position.

Figure 3:
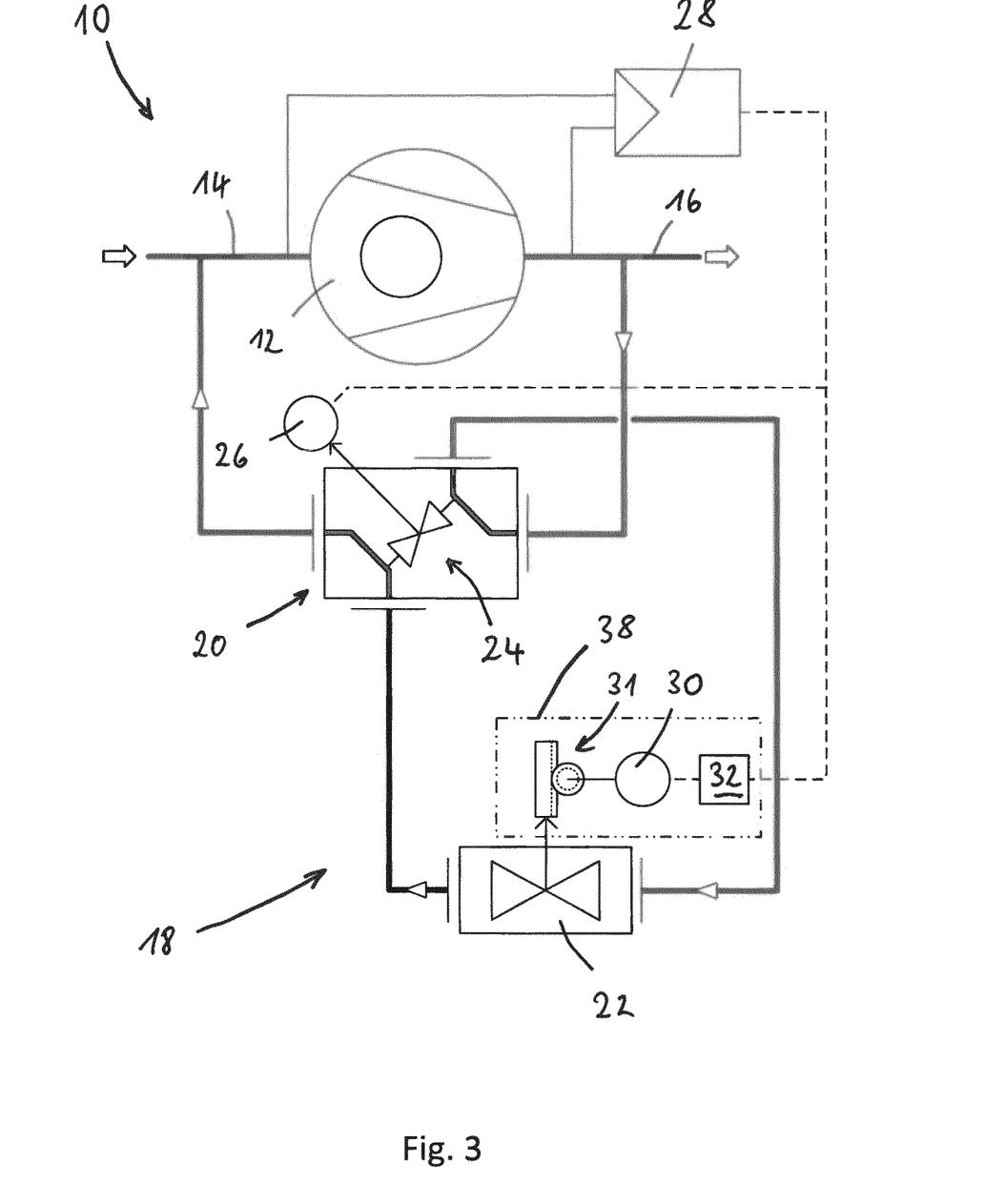

FIG. 3 shows a fluid conveying system 10 according to a further embodiment of the present invention. The embodiment in FIG. 3 differs from the embodiment in FIG. 2 only in the arrangement or design of the actuating device 18.

According to FIG. 3, the fitting piece 20 is equipped with internal line routing and integrated regulation element 24. The actuating element 24 integrated in the fitting piece is designed as a small regulating valve. The regulation element 24 is moved by the regulating drive 26, which is controlled by the anti-surge regulator 28. The regulation element 24 can move to a fail-safe position OPEN.

Furthermore, connections for the externally arranged control element 22 are provided on the fitting piece 20.

The control element 22 is designed as a large, non-pressure compensated control valve, in particular larger than the regulation element 24. Accordingly, the control element 22 can ensure a larger flow rate than the regulation element 24. The control element 22 can approach a safety position OPEN.

Furthermore, the control element 22 can be moved by an actuating drive 30 via an adjustment logic 32. Furthermore, a gear 31 with switchable gear ratio can be provided between the actuating drive 30 and the control element 22. The adjustment logic 32 can in turn receive signals for the adjustment of the control element 22 from the anti-surge regulator 28 and/or from the regulation element 24 or the actuating drive 26 for the regulation element 24.

The gas pressure present on the inlet side of the control element 22 acts towards opening. When a fast opening is requested, the gear 31 is switched to a different gear ratio, which causes the control element 22 to move much faster. This is possible because the actuating drive 30 is supported by the gas pressure in the opening direction.

In the embodiment according to FIG. 3, the actuating drive 30 and the gear 31 with switchable gear ratio thus form a device 38 for quickly moving the control element 22 into a safety position.

Figure 4:
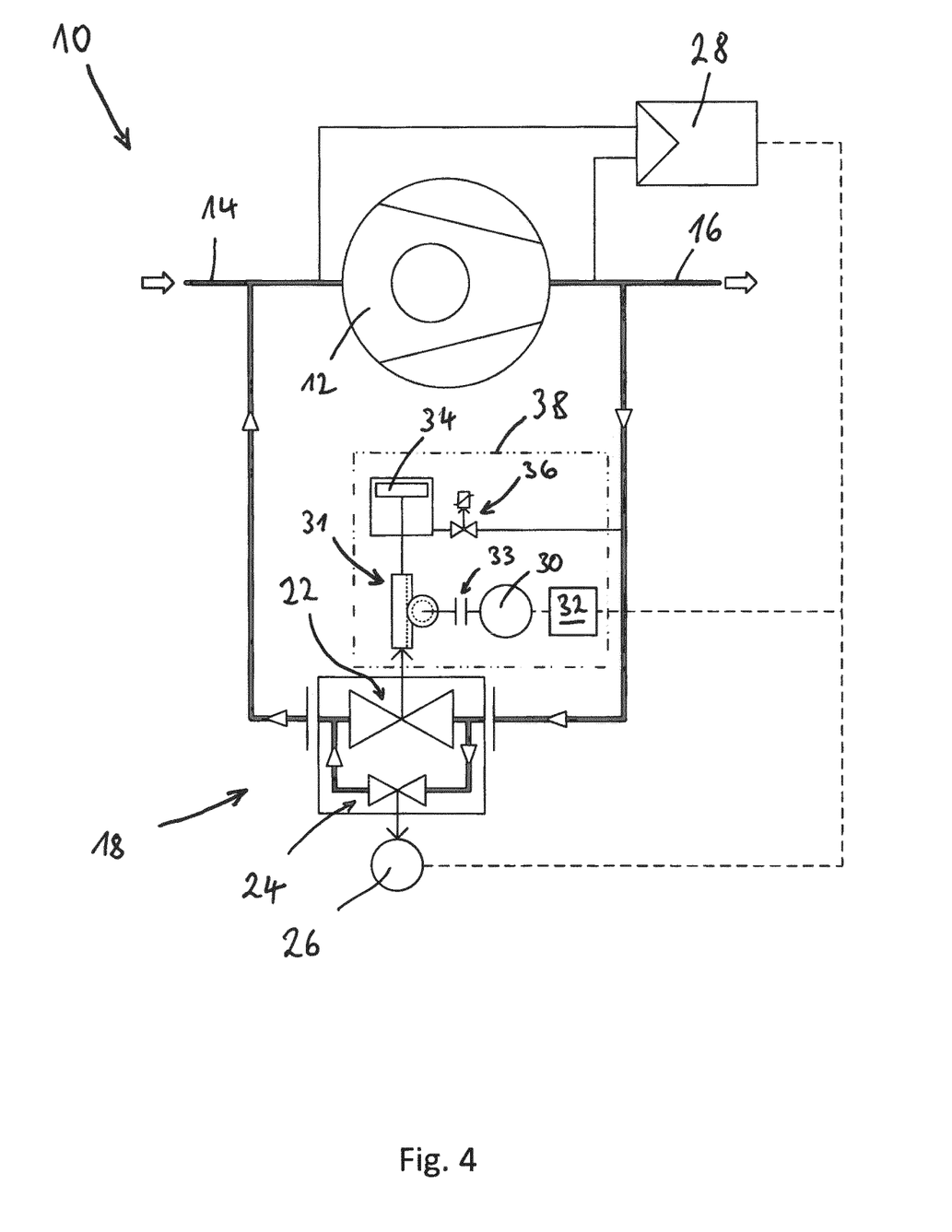

FIG. 4 shows a fluid conveying system 10 according to a further embodiment of the present invention. The embodiment in FIG. 4 differs from the embodiment in FIG. 2 only in the arrangement or design of the actuating device 18.

In the embodiment according to FIG. 4, the actuating device 18 again has a control element 22 and a regulation element 24. The control element 22 and the regulation element 24 are designed as a dual actuating element and dual valve, respectively, as shown in FIG. 4.

The control element 22 according to FIG. 4 is designed as a large, pressure-compensated control valve and can move to a fail-safe position OPEN. Integrated in the housing of the control element 22 is the smaller regulation element 24, which can also move to a fail-safe position OPEN. The regulation element 24 is moved by the actuating drive 26 and the actuating drive 26 is controlled by the anti-surge regulator 28.

The control element 22 is moved by the actuating drive 30 via an adjustment logic 32. The adjustment logic 32 receives signals for adjusting the control element 22 from the anti-surge regulator 28 and/or from the regulation element 24 or the actuating drive 26 for the regulation element 22.

A gear 31 and a switchable coupling 33 can also be provided between the actuating drive 30 and the control element 22. When a quick opening or quick relief is required, the actuating drive 30 can be uncoupled from the gear 31 via the switchable coupling 33. For quick opening or quick relief, the control element is driven by the opening piston 34 into a safety position, in particular into an OPEN position. The opening piston 34 is actuated by the upstream pressure of control element 22 or by the pressure of the process medium from discharge line 16. The solenoid valve 36 is open to ensure fail-safe functionality in the de-energized state, so that in the event of a power failure, the pressure from the discharge line 16 actuates the opening piston 34. By decoupling the actuating drive 30 from the trans-mission 31, a quick release can be facilitated or accelerated by the opening piston.

Thus, in the embodiment according to FIG. 4, the opening piston 34, the solenoid valve 36, the actuating drive 30 with gear 31 and coupling 33 form a device 38 for quickly moving the control element 22 to a fail-safe position.

Figure 5:
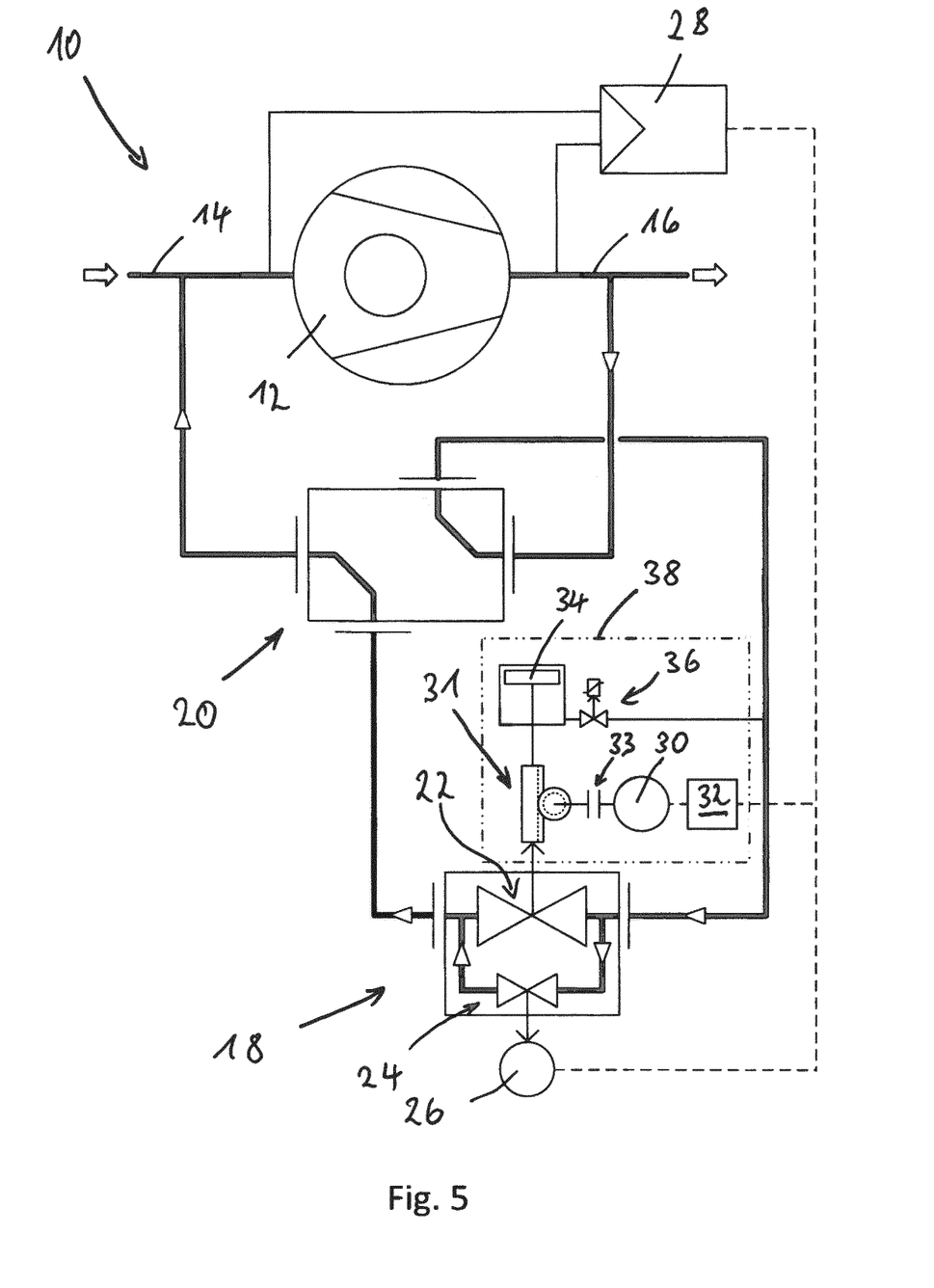

FIG. 5 shows a fluid conveying system 10 according to a further embodiment of the present invention. The embodiment in FIG. 5 differs from the embodiment in FIG. 4 only in that the actuating device 18 is connected to the suction line 14 and the discharge line 16 via a fitting piece 20.

Figure 6:
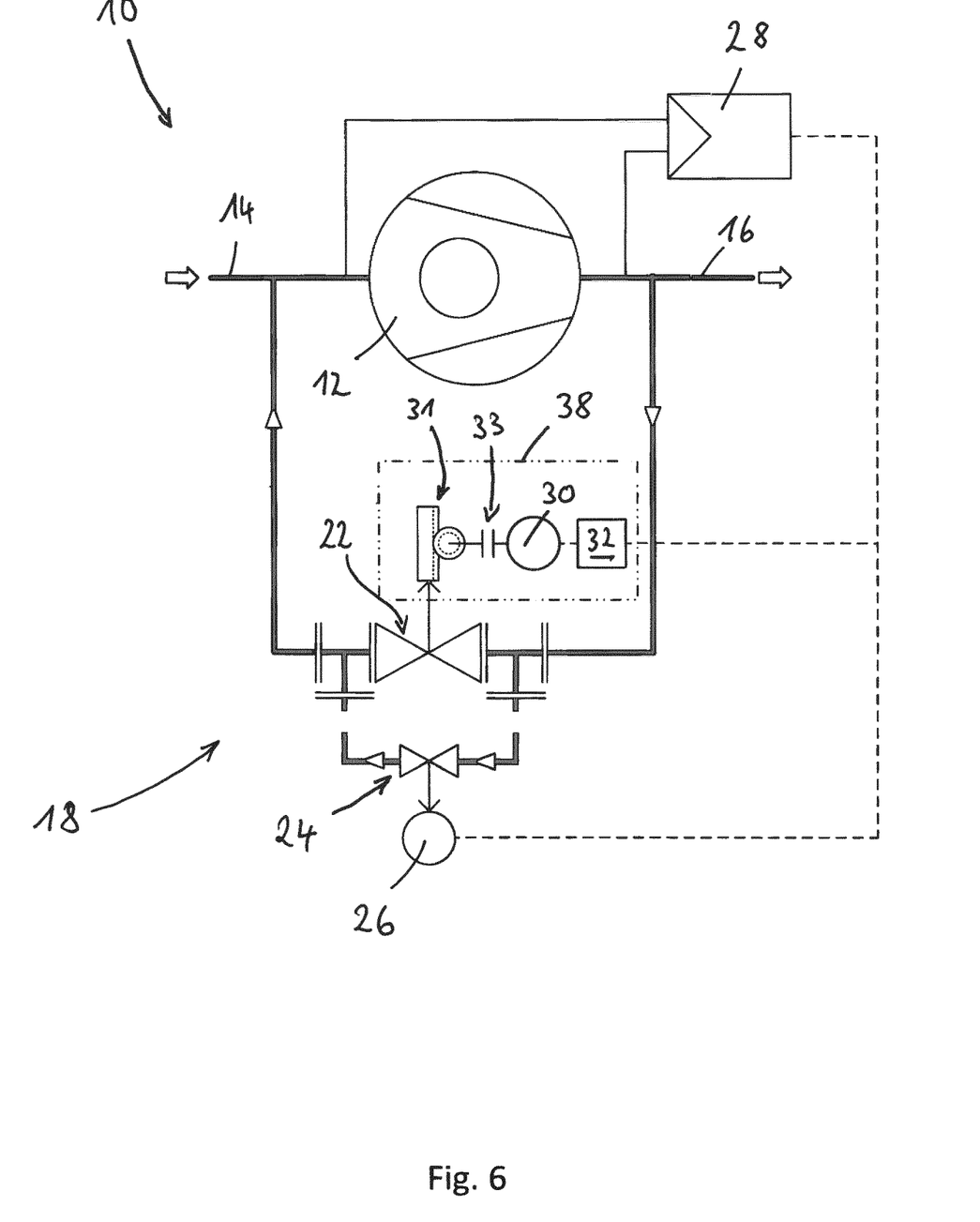

FIG. 6 shows a fluid conveying system 10 according to a further embodiment of the present invention. The embodiment in FIG. 6 differs from the embodiment in FIG. 2 again by the arrangement or design of the actuating device 18.

In the embodiment according to FIG. 6, the actuating device 18 has a control element 22 and a regulation element 24. The control element 22 and the regulation element 24 are installed as separately designed valves parallel to the discharge line 16 according to FIG. 5.

The control element 22 according to FIG. 6 is designed as a large, non-pressure compensated control valve and can move to a fail-safe position OPEN. Upstream and downstream of the control element, T-pieces of the pipeline are located in a parallel line, each of which has a connection for the regulation element 24. The small regulation element 24 connected to it can be moved to a fail-safe position OPEN. The regulation element 24 is moved by the actuating drive 26 and the actuating drive 26 is controlled by the anti-surge regulator 28.

The control actuator 22 may be moved by the actuating drive via an adjustment logic 32 and may receive signals from the anti-surge regulator 28 and/or from the regulating element 22, respectively, from the actuating drive 26 for the regulating valve 22 to adjust the control actuator 22.

A gear 31 and a switchable coupling 33 can also be provided between the actuating drive 30 and the control element 22. When a quick opening or quick relief is required, the actuating drive 30 can be uncoupled from the gear 31 via the switchable coupling 33.

The gas pressure present on the inlet side of the control element 22 acts towards opening. By decoupling the actuating drive 30 from the gear 31, rapid relief can be achieved by the pressure of the process medium acting directly on the control element 22 in the opening direction. This is possible because the control element 22 is designed as a non-pressure compensated control valve.

Thus, in the embodiment according to FIG. 6, the actuating drive 30 with gear 31 and coupling 33 form a device 38 for quickly moving the control element 22 into a fail-safe position.

Figure 7:
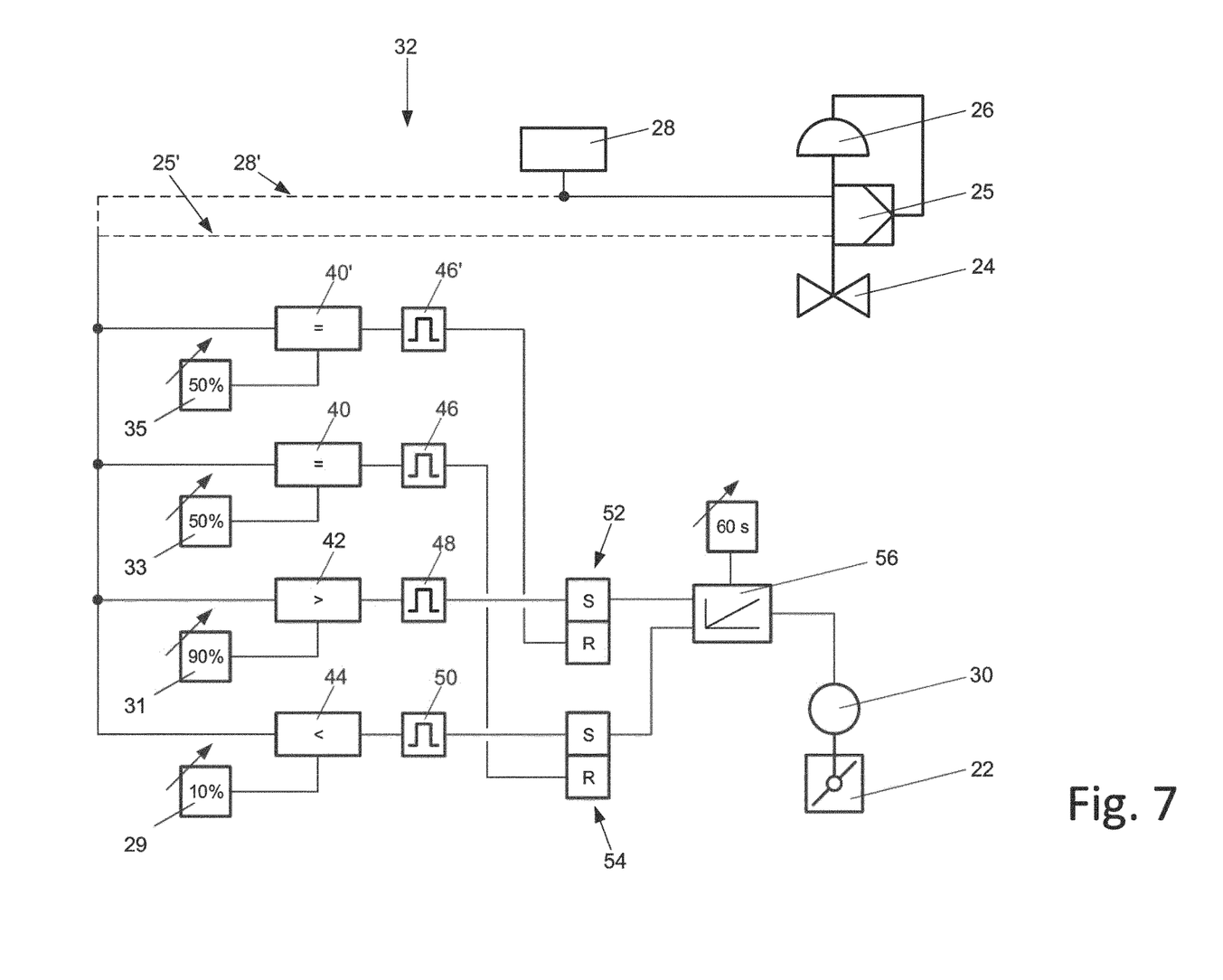

FIG. 7 shows a logic 32 for controlling a control element 22 depending on the position of a regulation element 24 according to an embodiment of the present invention. By means of the logic 32 shown in FIG. 7, the position of the control element 22 is readjusted depending on the position of the regulation element 24 when a predefined actuating signal and/or a predefined position of the regulation element 24 is exceeded or undershot. The operating position of the regulating valve 24 can be defined or issued by the actuating signal 28' of the anti-surge regulator 28 as well as by the analog feedback signal 25' of the positioner 25. The adaptation can be made application-related and can be different for opening and closing processes.

In the embodiment example shown in FIG. 7, the control actuator 22 is re-positioned if the regulation element 24 with a target operating range 27 between 10% and 90% exceeds a limit actuating value 31 of 90% or falls below a limit actuating value 29 of 10%. In the event of such an exceedance or undershooting, the logic 32 according to FIG. 7 initiates a movement of the control element 22 in the same direction of action and consequently supports the change in quantity targeted by the regulator 28. As soon as the regulation element 24 has reached a parameterizable position 33 or 35, which in the embodiment example is 50% in each case, the repositioning of the control element 22 is completed. This sequence can be repeated as desired, so that even very large quantities can be controlled sensitively.

To provide the functionality described above, the logic 32 of FIG. 7 includes comparators 40, 40', 42, and 44. The comparators 40, 40', 42 and 44 receive signals 28' from the anti-surge controller 28, which in turn controls the actuating drive 26 for the regulation element 24. Instead of receiving the control signal, the comparators 40, 40', 42 and 44 may also monitor the analog position feedback 25' from the regulation element. The comparator 40 or 40' detects and reports as soon as the regulation element 24 reaches the parameterized value 33 or 35 (for example 50%). The comparator 42 detects as soon as the regulation element 24 exceeds a limit actuating value 31 of 90%. The comparator 44 detects as soon as the regulation element 24 undershoots a limit actuating value 29 of 10%.

The values for the comparators 40, 40', 42 and 44 can be freely parameterizable.

The comparators 40, 40', 42 and 44 are followed by the pulser 46, 46', 48 and 50. The comparator 40 and the downstream pulser 46 reset the flip-flop switching element 54. The comparator 40' and the downstream pulser 46' reset the flip-flop switching element 52. The comparator 42 and the downstream pulser 48 reset the flip-flop switching element 52. The comparator 44 and the downstream pulser 50 reset the flip-flop switching element 54. A user-configurable ramp 56 is connected downstream of the flip-flop switching elements 52 and 54, via which the actuating drive 30 of the control element 22 is controlled.

If the comparator 42 detects that the regulating actuator 24 has exceeded a limit actuating value 31 of 90%, the flip-flop switching element 52 is set by the pulser 48 and the actuating drive 30 is actuated in the opening direction via a user-configurable ramp 56. By actuating the actuating drive 30, the control actuating element 22 is adjusted in such a way that the change in quantity targeted by the controller 28 is supported.

If the comparator 44 detects that the regulation element 24 has undershot a limit actuating value 29 of 10%, the flip-flop switching element 54 is set by the pulser 50 and the actuating drive 30 is activated in the closing direction via a user-configurable ramp 56. By actuating the actuating drive 30, the control element 22 is adjusted in such a way that the change in quantity targeted by controller 28 is supported.

If the limit actuating value 31 of 90% is exceeded, an adjustment of the control element 22 is activated until the comparator 40' detects that a position 35, for example 50%, has been passed. If this is detected, the flip-flop switching element 52 is reset by the pulser 46' and further actuation of the actuating drive 30 is stopped. The adjustment of the control element 22 is thereby terminated or at least interrupted. This process can be repeated as often as required as soon as the regulation element 24 passes through a limit actuating value.

If the value undershoots the limit actuating value 29 of 10%, an adjustment of the control element 22 is activated until the comparator 40 detects that a position 33, for example 50%, has been passed. If this is detected, the flip-flop switching element 54 is reset by the pulser 50 and further actuation of the actuating drive 30 is stopped. The adjustment of the control element 22 is thereby terminated or at least interrupted. This process can be repeated as often as required as soon as the regulation element passes a limit actuating value.

The invention claimed is:

1. An actuating device (18) for systems (10) with flowing fluid, comprising:
    at least one control element (22) being open-loop controlled adjustable between a plurality of operating positions,
    at least one regulation element (24) being closed-loop controlled adjustable, and
    a controller with a logic (32) for adjusting said control element (22),
    wherein said control element (22) and said at least one regulation element (24) are connected in parallel in order to influence the same process variable, and
    wherein said controller is set up for adjusting said control element (22) as a function of an operating position of said regulation element (24),
    wherein said controller is set up for adjusting, in an open-loop control, said control element (22) in order to generate a closed-loop controlled adjustment of said regulation element (24) back into a target operating range (27), and
    wherein said logic (32) for said control element (22) being configured to continue an adjustment of said control element (22) until said regulation element (24) has reached a predefined operating position (33, 35) within a target operating range (27) or passes a predefined operating position (33, 35) into a target operating range (27).

2. The actuating device (18) according to claim 1, characterized by a closed-loop control (25) being set up for adjusting said regulation element (24) as a function of a process variable influenced by said control element (22) and said regulation element (24).

3. The actuating device (18) according to claim 1, characterized by a target operating range (27) of said regulation element (24) extending between a high limit setting value (31) and a low limit setting value (29).

4. The actuating device (18) according to claim 1, characterized in that said regulation element (24) comprises an electric actuating drive (26) and that said control element (22) comprises an electric actuating drive (30).

5. The actuating device (18) according to claim 1, characterized in that said control element (22) comprises a larger flow capacity than said regulation element (24).

6. The actuating device (18) according to claim 1, characterized in that said control element (22) is adjustable between a plurality of operating positions for throttling a flowing fluid.

7. The actuating device (18) according to claim 1, characterized in that said regulation element (24) is designed as a regulating valve and said regulation element (24) is adjustable for throttling and a flowing fluid.

8. The actuating device (18) according to claim 1, characterized in that said control element (22) and said regulation element (24) are designed for use with centrifugal compressors (12), and said control element (22) is set up for start-up relief and for event-controlled rapid relief during operation of said centrifugal compressor (12).

9. The actuating device (18) according to claim 1, characterized in that said regulation element (24) is set up for tight-closing and for anti-surge.

10. The actuating device (18) according to claim 1, characterized by said control element (22) and said regulation element (24) being set up for checking a freedom of adjustment.

11. The actuating device (18) according to claim 1, characterized in that said control element (22) and said regulation element (24) form a structural unit and are designed as a dual actuating element, and said control element (22) comprises a housing with connections for the installation of said regulation element (24).

12. The actuating device (18) according to claim 1, characterized in that in order to reduce dead times, said regulation element (24) is set up with a positioner, to act from a closed operating position and in the event of a control deviation of the regulation, with full actuating capacity until said regulation element effectively begins to open, and from the beginning of opening to switch over from the open-loop controlled adjustment with full capacity to a closed-loop adjustment with standard capacity.

13. The actuating device (18) according to claim 1, characterized in that said control element (22) is designed as a butterfly valve actuating element, wherein the regulating range of said regulating element (24), being designed as regulating valve, is dimensioned at least as large as a limit range, adjacent to a CLOSED position of the butterfly valve actuating element, in which continuous operation is prevented by control parameters.

14. The actuating device (18) according to claim 1, characterized by said control element (22) and said regulation element (24) being set up as a fail-safe device to use the pressure of the fluid as the exclusive, main or supporting actuating force for moving to a safety position in the event of failure of a supply of drive energy to said control element (22) and said regulation element (24).

15. The actuating device (18) according to claim 1, characterized by an actuating drive (26, 30) of said control element (22) and of said regulation element (24) being able to be uncoupled for approaching a safety position.

16. The actuating device (18) according to claim 1, characterized by said control element (22) and said regulation element (24) being arranged to approach a safety position driven by an opening piston (34) for rapid relief.

17. A system (10) with a conveying device for a flowing fluid, and with said actuating device (18) according to claim 1, wherein said control element (22) and said regulation element (24) are installed in lines arranged in parallel, and wherein said control element (22) is installed in a line in which connections for the installation of said regulation element (24) are integrated immediately upstream and downstream of said control element (22).

18. A system (10) with a conveying device for a flowing fluid, and with said actuating device (18) according to claim 1, wherein a fitting piece (20) is provided in at least one line for the connection of said control element (22) and said regulation element (24) and wherein said regulation element (24) is integrated in a fitting piece (20) having connections for the installation of said external control element (22).

* * * * *